United States Patent [19]
Schulenberg

[11] 3,802,048
[45] Apr. 9, 1974

[54] APPARATUS FOR SIMULTANEOUSLY APPLYING FINS TO A PLURALITY OF SUBSTANTIALLY PARALLEL STATIONARILY HELD PIPES

[75] Inventor: Heinrich Schulenberg, Bochum, Germany

[73] Assignee: Gea Luftkuhlergesellschaft Happel GmbH & Co. KG, Bochum, Germany

[22] Filed: Aug. 7, 1972

[21] Appl. No.: 278,614

[30] Foreign Application Priority Data
Aug. 6, 1971 Germany............................ 2165973

[52] U.S. Cl............................................. 29/202 R
[51] Int. Cl............................................ B23p 15/26
[58] Field of Search .......... 29/202 R, 202 D, 200 B, 29/208 R

[56] References Cited
UNITED STATES PATENTS
2,133,932   10/1938   Whistler et al.................... 29/202 R
2,247,730   7/1941   O'Brien............................ 29/202 R Primary Examiner—Thomas H. Eager
Attorney, Agent, or Firm—Michael S. Striker

[57] ABSTRACT

An apparatus for simultaneously applying fins to a plurality of pipes arranged substantially parallel and transversely spaced from each other and held stationarily on one of the ends thereof. Fins are pushed onto the pipes from the free opposite ends of the latter by means of a plurality of spaced substantially parallel plate-shaped entrainment members moved by endless transporting means, the working run of which is movable substantially parallel to the pipes from the free toward and beyond the fastened ends of the latter. Each of the entrainment members is tiltable between a working position extending substantially normal to the axes of the pipes and a releasing position. Each of the entrainment members is provided with at least two glide shoes which are slidably supported on support members attached to and closely arranged along part of two substantially parallel transversely spaced chains, each of which has a working run extending substantially parallel to that of said endless transporting means and being moved in a direction opposite thereto.

4 Claims, 3 Drawing Figures

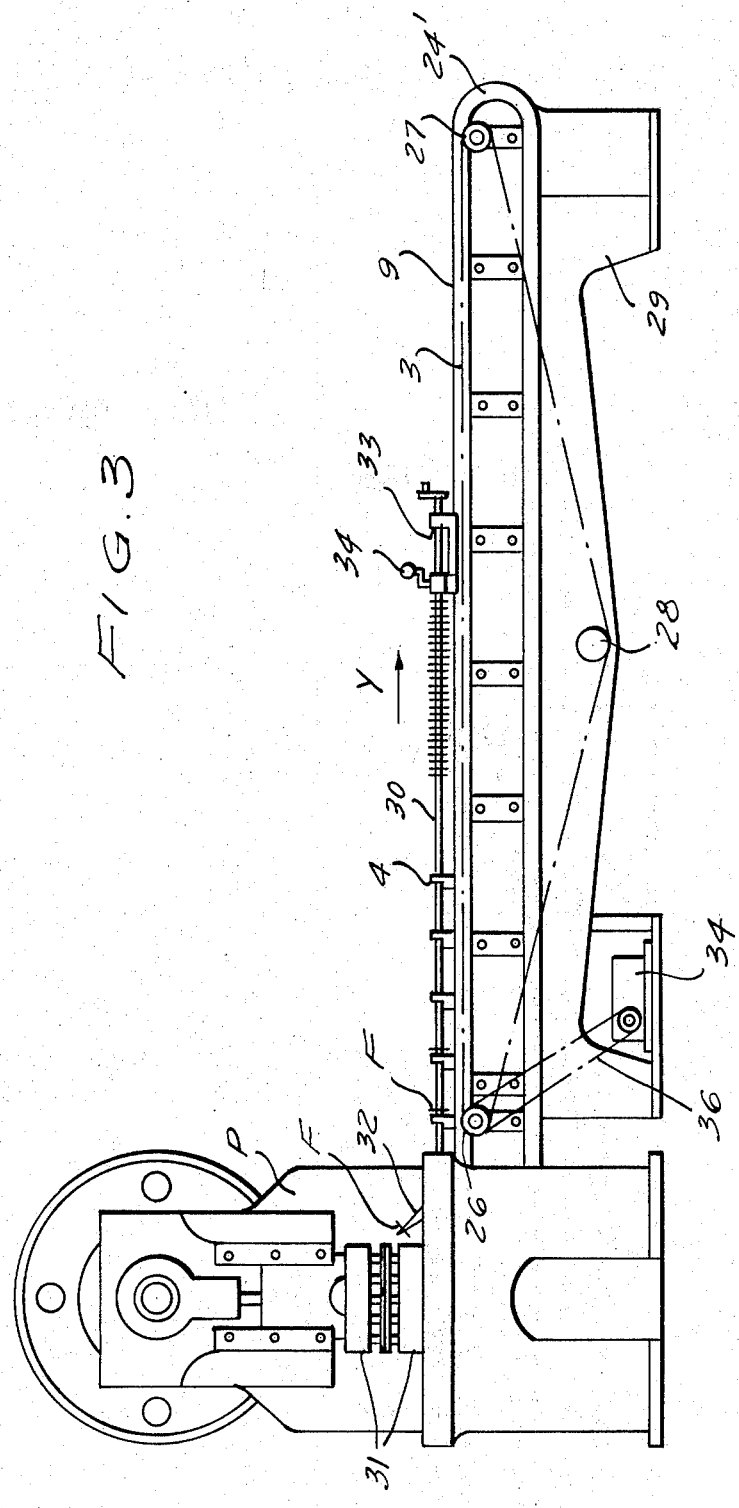

APPARATUS FOR SIMULTANEOUSLY APPLYING FINS TO A PLURALITY OF SUBSTANTIALLY PARALLEL STATIONARILY HELD PIPES

BACKGROUND OF THE INVENTION

The present invention relates to an apparatus for applying fins to a plurality of stationarily arranged adjacent substantially parallelly extending pipes by means of endless transporting means on which a plurality of substantially plate-shaped parallel entrainment members are tiltably mounted spaced in longitudinal direction of the transporting means from each other and each of which is provided with at least one glide shoe which, during application of the fins onto the pipes, are slidingly supported on a support chain having a working run extending parallel and adjacent to the working run of the endless transporting means and in which the working run of the support chain carries over a distance which is at least equal to the length of the pipes a plurality of closely adjacent support members on which the glide shoes are slidably guided. Each of the pipes may be provided with individual fins so that each entrainment member will push simultaneously a plurality of fins onto the parallely arranged pipes, however; it is also possible with the entrainment members to push onto the pipes fins which extend transversely over the plurality of the parallely arranged pipes so that the latter are connected by the fins to each other.

In known apparatus of the aforementioned kind there is only a single glide shoe provided for each entrainment member which is arranged substantially midway between opposite side edges of the entrainment member whereby all glide shoes are guided on a single support chain, the working run of which extends parallel to the working run of the endless transporting means on which the entrainment members are mounted and which is moved in opposite direction to the direction of the movement of the working run of the endless transporting means. Since the support chain is provided only over part of its length with closely arranged support members on which the glide shoes are slidably guided, and since the support chain is moved in a direction opposite to the movement of the endless transporting means which carries the entrainment members, the glide shoe on one entrainment member will become disenaged from the last support member on the support chain, as considered in the direction of movement of the latter, to tilt thereby from its active position to a releasing position, before the glide shoe on the entrainment member trailing the one entrainment member will be released to tilt to its releasing position. The support members are tiltably linked to each other and have a length extending in the direction of the support chain which is considerably smaller than the distance between two successive entrainment members.

In known apparatus of this type each of the entrainment members is provided in the region of its lower edge and substantially midway between side edges thereof with a single glide shoe which at its leading end, as considered in the direction of movement of the entrainment member, is tiltably mounted about a tilting axis extending substantially normal to the direction of movement of the entrainment member whereas the glide shoe in its rearward region is provided with a slide member releasably attached to the glide shoe and which is guided on an upper guide surface formed by upper faces of the plurality of support members. The endless transporting means which carries the entrainment members as well as the endless support chain carrying the support members are constructed as link chains, preferably as sprocket chains. The working run of the single support chain has approximately the same length as the working run of the endless transporting means and the supporting members are connected to outwardly projecting portions of the links forming the support chain. The length of each of the adjacent support members carried by the support chain is, with the exception of the last support member, as considered in direction of movement of the support chain, preferably substantially equal to that of two links of the support chain, whereas the last support member on the support chain has a length considerably greater than the length of each of the other support members.

This known apparatus has the advantage that due to the uniform movement of the support members an exact relative position between the end of the sliding guide constituted by the plurality of support members and the glide shoes of the entrainment members will be obtained so that the entrainment members will successively tilt from their active working position in which they move the fins along said pipes to their releasing position at exactly determined locations along the pipe or pipes. Accordingly, it is possible with this known apparatus to obtain an exact spacing, with close tolerances, of the ribs in their finally applied position on the pipe or pipes, even if the endless transporting means is moved at high speed so that the apparatus will apply a great number of fins per time unit on the pipe or pipes.

The uniform movability of the guide means for the entrainment members also permits, by changing the relative speed of the endless transporting means carrying the entrainment members and the support chain, to change the distance at which the fins are finally positioned on the pipes in any desired manner. It is also possible, by varying the aforementioned speed, to change the fin distance on the pipes continuously or in a discontinuous manner. An additional advantage of this known apparatus consists in that the entrainment members may be maintained with great exactness in their working position until they have pushed the fins respectively to the desired end position on the pipes. After the glide shoe of one entrainment member has moved over the last support member on the supporting chain as considered in direction of movement of the latter, the entrainment member will tilt under the influence of a moment imparted by the glide shoe connected thereto, as well as due to the pressure exerted thereon by the fin, from its working position to its releasing position releasing the fin in its final position so that even at high operating speed of the apparatus a very exact spacing between successive fins may be obtained.

Each of the entrainment members is provided in a known apparatus of this type also in this case in which the entrainment member is constructed to apply fins to a plurality of laterally displaced and parallely extending pipes, only with a single glide shoe arranged midway between the lateral side edges of the respective entrainment members, and only a single support chain is provided for guiding the glide shoes. Experience has however shown that during simultaneous applying of fins to a plurality of adjacent pipes, especially during applying of fins to four or more stationarily arranged pipes, the friction resistance between the fins and the pipes is so great that, during use of a single glide shoe on each entrainment member, the forces applied by the glide shoe onto the support members of the support chain will become so great that the support members and the glide shoes on the entrainment members are subjected to considerable wear and had therefore to be correspondingly heavily dimensioned. In addition, there will occur in this case a detrimental and, due to the fact that the individual pipes may provide different friction resistances onto the fins to be applied thereto, a non-uniform load distribution onto the entrainment members, respectively their glide shoes, and therewith also onto the support members on the support chain.

SUMMARY OF THE INVENTION

It is an object of the present invention to overcome the aforementioned disadvantages resulting from the above-described known construction for apparatus of this type during application of fins to a plurality of adjacently arranged pipes.

It is a further object of the present invention to reduce the wear of the glide shoes of the entrainment members and of the support members of the support chain so that the glide shoes and the support members may be dimensioned relatively lighter as compared with the apparatus known in the art and to obtain a substantially uniform and advantageous load distribution.

With these objects in view, the apparatus according to the present invention comprises at least two glide shoes on each entrainment member which are slidably guided on support members carried by a pair of parallel supporting chains. For simultaneously applying fins to seven pipes arranged adjacent to each other it is usually sufficient to provide two glide shoes for each entrainment member and two parallel laterally spaced support chains cooperating therewith. In this way it is possible to maintain the forces which are transmitted from the glide shoes onto the support members relatively small so that excessive wear of the support members and the glide shoes may be avoided. Due to the essentially smaller forces which are transmitted from the glide shoes onto the support members and due to the thus reduced specific surface pressure between the engaging faces thereof, it is possible to construct the glide shoes as well as the support chain considerably lighter as compared with the above-described construction known in the art. In addition, with the specific construction according to the present invention, are essentially better and more uniform distribution of the load onto the entrainment members, the glide shoes, the support members and the chains carrying the support members is obtained which in turn permits likewise a lighter dimensioning of these elements while assuring a greater useful life thereof.

The glide shoes on each entrainment member are preferably constructed in identical manner so that the glide shoes are interchangeable and the stock keeping of these elements is simplified.

It is further advantageous to construct the supporting chains arranged laterally spaced from each other in substantially identical manner. This again will result in that the supporting chains, respectively the components thereof, for instance the support members, are interchangeable with each other.

According to a further feature of the present invention, the parallel and adjacently arranged support chains are driven synchronously and adjusted in such a manner that the last support members on the support chains, as considered in the direction of the movement thereof, simultaneously release all glide shoes on a respective entrainment member. This in turn results in a uniform load distribution on the entrainment member and the glide shoes mounted thereon.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing.

BRIEF DESCRIPTION OF THE DRAWING

FIG. 3 is a schematic overall side view of the apparatus.

DESCRIPTION OF THE PREFERRED EMBODIMENTS

Figure 1:
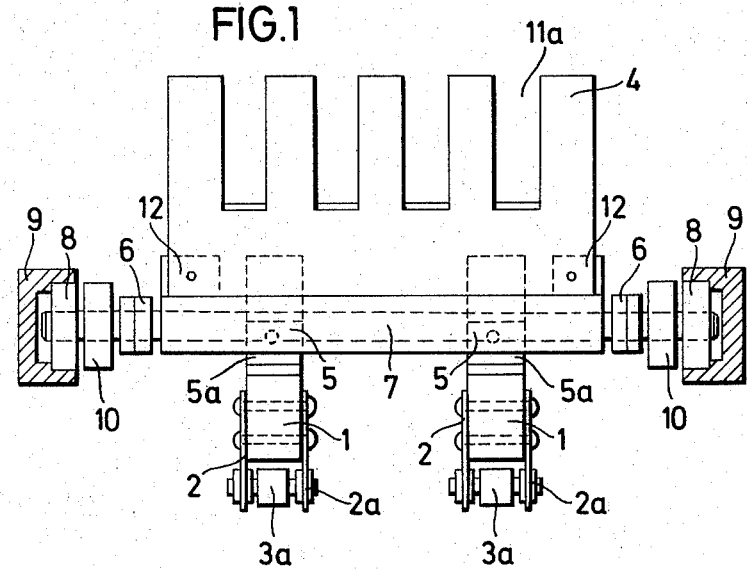
FIG. 1 is a partial end view of the apparatus according to the present invention, shown partially in section.
Figure 2:
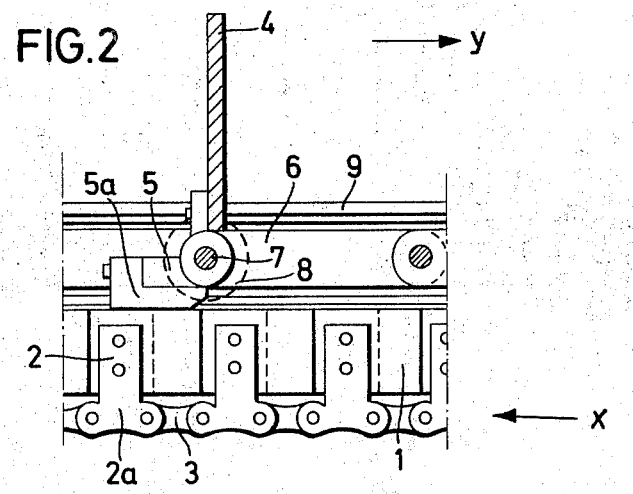
FIG. 2 is a partial side view of the elements shown in FIG. 1, also partially in section.

Referring now to the drawing and more specifically to FIG. 3 of the same, it will be seen that the apparatus according to the present invention mainly comprises support means 29 in form of an elongated bench, at one end of which, shown in FIG. 3 as the left end, a punch press P is arranged. The punch press P operates die means 31 mounted thereon which are constructed, in a known manner not forming part of the present invention, to punch fins F from sheet metal fed into the die means 31. Each of such fins may have a circular outline and be provided with a central circular hole corresponding to the outer diameter of the pipe to which it is to be applied and preferably also with a short axially extending collar surrounding the central opening, or, each of the fins to be stamped by the die means may have an elongated configuration formed with a plurality of circular holes which are spaced in transverse direction of the fin from each other, and axially extending collars about each hole, when the fin is to be applied to a plurality of pipes arranged transversely spaced from and parallel to each other, in which the pipes extend respectively through the holes formed in the single fin member and the latter also serves to connect the pipes to each other. The fins F stamped by the die means 31 are fed seriatim by a feeding device of known construction and not shown in the drawing onto a plurality of horns 32 which are respectively slipped on the free ends of a plurality of pipes 30 held at the end or ends spaced from the press P by holding means 33 including clamping means 34 of known construction, which, when tightened, are adapted to clamp the end or ends of the pipes distant from the press P in stationary position. A pair of parallel transversely spaced guide means 9, only the front one of which is visible in FIG. 3, are mounted on the upper surface of the bench 29 extending in longitudinal direction of the same. Each of the guide rail means 9 has an upper portion and a lower portion extending downwardly spaced and parallel to the upper portion and the two portions are integrally connected to each other at opposite ends by semicircular portions 24', only the right one being shown in FIG. 3, whereas the left one is hidden by the press P. Each of the guide rail means is substantially U-shaped in cross-section, as will be described later on in detail and serves, as will likewise be described later on, to guide endless transporting means in form of sprocket chains 6 which carry a plurality of entrainment members 4 spaced in the longitudinal direction of the chains and constructed and arranged, as will be described later on, to push the fins F in longitudinal direction of the pipes 30 which are held in stationary position parallel and upwardly spaced from the upper portion of the guide rail means by the aforementioned holding means 33. The holding means 33 is mounted on the upper portion of the guide rail means 9 adjustably in longitudinal direction of the latter so that pipes of different lengths may be held in proper position. The apparatus further includes a plurality of endless support chains 3 which carry over part of their length a plurality of closely adjacent support members 1 for a purpose as will be described later on. The upper run of the endless support chains extends parallel and downwardly spaced from the upper run of the sprocket chains which carry the entrainment members.

The chains 3 are guided over rollers or sprocket wheels 26, 27, 28 and are synchronously driven from a motor 34 and a chain or ball drive 36.

Referring now to the other Figures of the drawing, it will be seen that the embodiment of the apparatus illustrated therein comprises a pair of parallel support chains 3, (FIG. 1) which are laterally spaced from each other and each of which carries over part of its length a plurality of support members 1.

The support members 1 have, with the exception of the support members which, in the direction of the movement of the support chain indicated by the arrow x, form the first and the last support member, a substantially parallelogram configuration in top view. The endface of adjacent support members which face each other are arranged substantially normal to the upper guide faces thereof and extend for all support members 1 at an angle of 40–60° to planes arranged normal to the direction of movement x of the support chain. The width of each support member is about 20–25 milimeters, whereas the height thereof is, as compared to its width, considerably greater.

Sideplates 2 arranged exactly opposite in transverse direction are connected to the side faces of the support members 1 and extend substantially over the whole height thereof. The lower ends 2a of the sideplates are constructed as links of a sprocket chain 3 which is arranged beneath the support members. Each second link of the sprocket chain 3 is thereby formed from the lower end 2a of a sideplate so that the length of the support members, with the exception of the first and last support members, as considered in the direction of movement of the support chain, is equal to the length of two links of the sprocket chain. The links of the sprocket chain are connected by link bolts on which rollers 3a are turnably mounted for engagement with sprockets wheels driving the support chains.

The entrainment members 4 mounted on endless transporting means are, by means of glide shoes 5, slidingly guided on the support members 1 of the support chains. The endless transporting means is constituted by a pair of laterally displaced chains 6, the working runs of which extend parallel to the axes of the pipes 30 to be provided with fins and these working runs are driven during the operation of the apparatus in the direction indicated by the arrow y. The entrainment members 4 are connected to the chains 6 tiltably about the bolts 7 which are arranged horizontally and normal to the direction y. The bolts 7 serve at the same time as connecting bolts for the links of the chains 6 and are provided at opposite ends thereof with guide rollers 8 which are guided in the aforementioned U-shaped guide rails 9 of the apparatus. Transport rollers 10 are further freely turnably mounted on the bolts 7 respectively adjacent and inwardly of the guide rollers 8. The rollers 10 are adapted to be engaged by a driven sprocket chain, not shown in the drawing, for driving the chains 6 in the direction indicated by the arrow y.

Each of the entrainment members 4 is provided in the upper region thereof in the embodiment illustrated in the drawing with four substantially rectangular cutouts 11a through which the pipes to which fins are to be applied extend. The embodiment illustrated in the drawing is therefore constructed for simultaneously applying fins to four adjacently arranged pipes, but evidently, each entrainment member may also be provided with more then four cutouts if more then four pipes are to be provided with fins.

The width of each cutout 11a has to be slightly greater than the outer diameters of the pipes to which fins are to be applied, but smaller than the lateral dimension of these fins. Individual fins may be applied to each of the pipes, but it is also possible to use fins which extend transversely over a plurality of pipes and form thereby connecting elements for those pipes.

A sleeve is turnably mounted on each bolt 7 between the chains 6 and each of the sleeves has a pair of substantially radially extending lugs 12 at opposite ends thereof to which the respective entrainment member 4 is connected by bolts or the like. Similar lugs are connected spaced from each other inwardly of the lugs 12 and equally spaced from the entrainment members to which a pair of glide shoes 5 are connected. The glide shoes 5 extend essentially in a direction opposite to the advancing direction y of the entrainment members and each is provided at its bottom face thereof with a slide member 5a formed from wear resistant steel. Due to this construction, each of the entrainment members is subjected by the fins to a turning moment tending to turn the latter about the axis of the bolt 7 in a direction opposite to the advancing direction y.

In the embodiment illustrated in the drawing, there are provided two laterally arranged and parallel supporting chains of equal construction, the lateral distance of which corresponds to that of the two glide shoes 5 on each entrainment member 4. The width of the glide shoes 5 substantially corresponds to that of the support members 1.

The entrainment members 4 are held in their active position extending substantially normal to the axes of the pipes when the slide members 5a of the glide shoes 5 slide on the upper faces of the support members 1 of the two support chains. The working run of each support chain is arranged parallel to the working runs of the chains 6 so that the slide members 5a on the glide shoes 5 of the entrainment members 4 will be parallel to the guide faces formed by the upper faces of adjacent support members 1. Each support chain has a working run which is at least as long as the pipes to which the fins have to be applied, whereby only half of the length of each support chain is provided with support members 1.

The above-described apparatus will operate as follows:

After a plurality of pipes have been clamped in proper position by the holding and clamping means 33, 34, the press P is started and simultaneously or shorlty thereafter the drive for the endless transporting means carrying the entrainment member 4 as well as the drive of the support chains 3 is started whereby the entrainment members 4 on the upper run of the endless transporting means are moved in the direction as indicated by the arrows y, whereas the support chains are moved in the opposite direction as indicated by the arrows x. Before starting the movement of the endless transporting means and the support chains, the position of the supporting chain is adjusted in such a manner that, when the first fin moved by the corresponding entrainment member 4 reaches the desired end position on the pipes, the trailing end of the trailing support member will pass the lateral slide shoes 5a on this entrainment member and free the latter so that the entrainment member may tilt from its vertical active position in counterclockwise direction to its releasing position to thereby become disengaged from the respective fin, and the entrainment member will then move in this releasing position until it is moved back to its active position by means not forming part of the present invention.

It will be understood that each of the elements described above, or two or more together, may also find a useful application in other types of the apparatus for applying fins to stationarily held pipes differing from the types described above.

While the invention has been illustrated and described as embodied in apparatus for simultaneously applying fins to a plurality of substantially parallel and stationarily held pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention and therefore such adaptations should and are intended to be comprehended within the meaning and range of equivalence of the following claims.

What is claimed as new and desired to be protected by Letters Patent is set forth in the appended claims:

1. In an apparatus for applying fins onto a plurality of adjacently arranged substantially parallel pipes held stationarily in the region of one of the ends thereof in which the fins are pushed seriatim from the opposite ends of the pipes onto the latter by means of a plurality of spaced substantially parallel plate-shaped entrainment members moved by endless transporting means having a working run movable substantially parallel to the longitudinal direction of the pipes from the opposite ends towards and beyond the one ends thereof, and in which each entrainment member is connected to said transporting means tiltably about a tilting axis between a working position substantially normal to the axes of the pipes and a releasing position, a combination comprising at least two glide shoes fixed to each entrainment member; and supporting means engaging the glide shoe on each entrainment member for maintaining the latter in said working position until the entrainment member has moved fins to the proper location on the pipes and thereafter permitting the entrainment member to tilt about its tilting axis to said releasing position, said support means comprising at least two endless laterally spaced substantially parallel chains having a working run extending substantially parallel to that of said endless transporting means and moving in a direction opposite thereto, each of said chains carrying over part of its length a row of closely adjacent support members having guide face adaptable to be engaged by said glide shoes for holding said entrainment members in their working position.

2. A combination as defined in claim 1, wherein the glide shoes on each entrainment member have substantially the same configuration and construction.

3. A combination as defined in claim 1, wherein said laterally spaced chains are of substantially the same construction.

4. A combination as defined in claim 1, and including drive means for synchronously driving said parallel, laterally spaced chains, said chains being adjusted in such a manner that the last support members thereon, as considered in the direction of movement of said chains, become disengaged from the glide shoes on respective entrainment members at exactly the same time.

* * * * *